(No Model.)
S. E. WILSON.
PROCESS OF AND APPARATUS FOR TREATING GARBAGE OR OTHER SUBSTANCES.
No. 567,210. Patented Sept. 8, 1896.
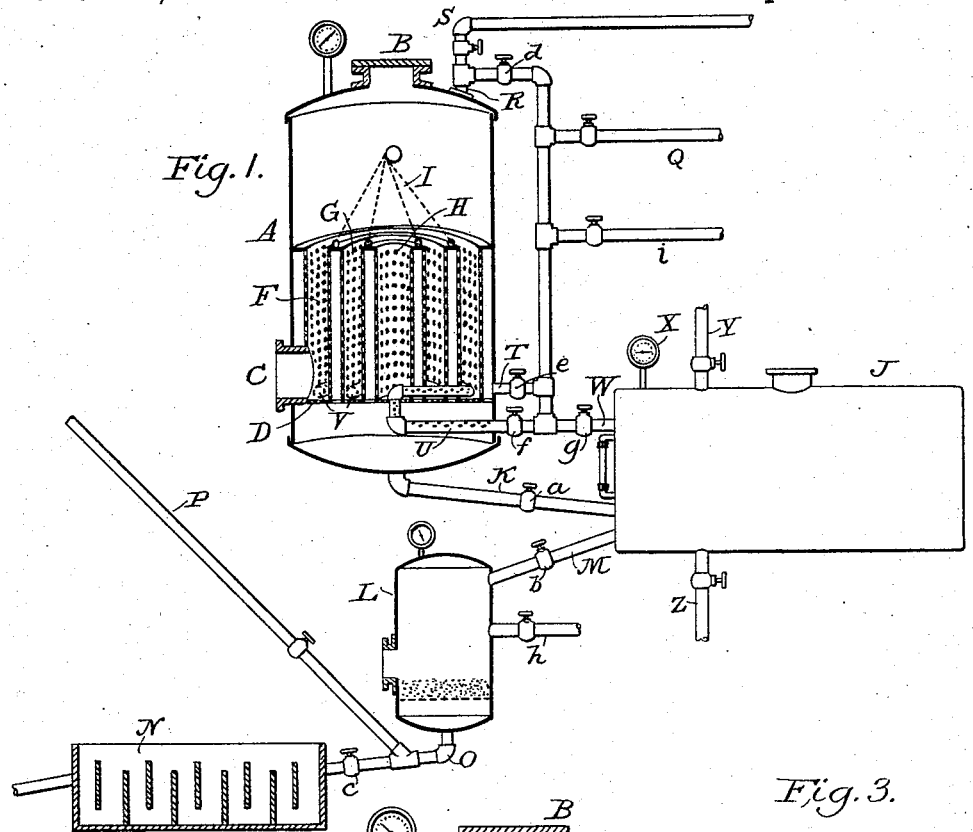
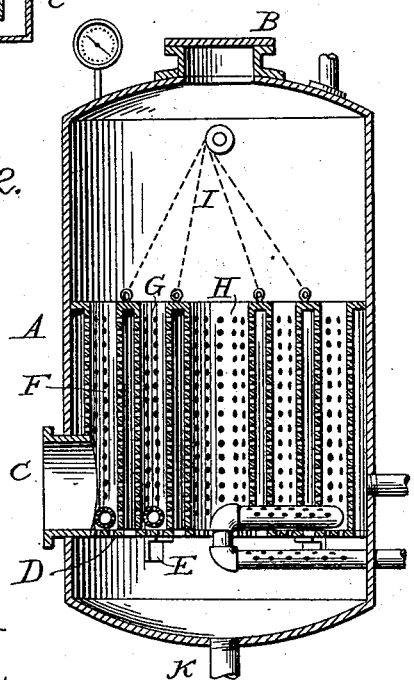
Witnesses
James F. Duhamel
D. E. Burdine
Inventor:
Stephen E. Wilson,
by Dodge Sons,
Attorneys.

UNITED STATES PATENT OFFICE.

STEPHEN E. WILSON, OF FRENCH LANDING, MICHIGAN.

PROCESS OF AND APPARATUS FOR TREATING GARBAGE OR OTHER SUBSTANCES.

SPECIFICATION forming part of Letters Patent No. 567,210, dated September 8, 1896.

Application filed May 29, 1896. Serial No. 593,652. (No model.)

*To all whom it may concern:*

Be it known that I, STEPHEN E. WILSON, a citizen of the United States, residing at French Landing, in the county of Wayne and State of Michigan, have invented certain new and useful Improvements in Apparatus for and Methods of Treating Garbage or other Substances, of which the following is a specification.

My invention relates to an improved apparatus for and method of treating garbage, distillery-slops, and the like, or any substance containing grease, moisture, or liquid.

In the accompanying drawings, Figure 1 is a diagrammatic view of my improved apparatus; Fig. 2, a sectional view of one of the tanks, and Fig. 3 a detail view.

The object of my invention is so to construct and operate the apparatus hereinafter set forth that a large percentage of the moisture and liquid shall be removed from the materials under treatment, and that there shall be recovered therefrom all, or nearly all, grease that may be present.

It is to be understood that I do not restrict myself to the treatment of any particular material or class of materials, nor to the production of any particular ultimate product, as the apparatus may be used to treat various substances, and the resultant products may be numerous and varied. The apparatus and method are, however, especially efficacious where the material under treatment requires cooking and contains grease which it is desired to recover. The method of applying the fluid-pressure is also found in practice to work to great advantage in separating liquid from various substances.

Referring to the annexed drawings, A indicates a tank provided at its upper end with a charging-opening B, and at one side, near the lower end, with a discharge-opening C, both of which may be closed tight whenever necessary. Below the opening C and extending across the tank is a grid or perforated false bottom D, mounted upon suitable supports E in the lower part of the tank. Within the tank, and set somewhat away from its inner wall, is a perforated wall or screen F, extending upward from the grid or false bottom to a suitable height and preferably closed at its top or upper end. The lower end of this screen has free communication with the space below the perforate grid. The screen F may be made fast to the tank or shell A, or the body of the tank itself may be perforated, and a shell placed around the tank thus forming the screen.

G and H denote two hollow draining-chambers, preferably formed of plates of perforated metal, said chambers resting upon the grid and being surrounded by the screen F. Like said screen they are open at the bottom, have communication with the space below the grid, and are preferably closed at their upper ends. One or more of these chambers may be used.

Chains or rods I or other suitable lifting devices are attached to the upper ends of the draining-chambers, by which they may be elevated when necessary.

J indicates a second tank, which, for clearness of reference, we may term the "collecting" or "storage" tank. A pipe K extends from the bottom of tank A into tank J, said tank J being placed preferably, though not necessarily, below the level of the perforate grid D. A suitable valve *a* is provided in this connecting-pipe K. Cooling-coils or other means may be in some instances used in connection with the tank, if desired.

L denotes a third tank, advisably placed on a lower level than tank J and connected with said tank by a pipe M, provided with a valve *b*. This tank has a grid or false bottom secured within it near its lower end, upon which is placed any suitable filtering medium, the character of which will be determined by the nature of the material under treatment. A manhole capable of being tightly closed is provided in the side of the tank, so that ready access may be had to the interior thereof for the renewal or cleaning of the filtering-bed.

N designates a separating or settling box or basin which communicates with the tank L beneath the filtering-bed through a pipe O, provided with a valve *c*; or any other suitable receptacle may be employed.

The pipe O is provided with a valved lateral branch pipe P, through which the material may be forced instead of being passed into the settling-basin.

Each of the tanks A, J, and L should be built to withstand the pressure necessary to the carrying out of the process, and said tanks are each provided with a pressure-gage.

Q denotes a pipe leading from a source of supply of steam under pressure. From this pipe and extending into the upper part of tank A is a pipe R, provided with a valve $d$ and also with a valved blow-off S.

Communicating with the pipe Q and with the space between the body of tank A and the screen F is a pipe T, provided with a valve $e$, and extending into the tank below the grid D is a perforated pipe U, fitted with a valve $f$. The pipe U extends up through the grid and terminates in a perforated coil V, which rests upon the upper face of the grid. This coil may be placed below the grid if found more convenient. The pipe Q is also adapted to be placed in direct communication with the tank J through a pipe W, provided with a valve $g$.

The tank J is provided with a manhole with a gage-glass or sight-gage X and valved outlets Y and Z. Tank L is also provided with a valved outlet $h$.

The perforate or foraminous grid or false bottom and the walls of chambers G and H are preferably formed in the manner shown in detail in Fig. 3. As will be seen, the openings are reamed out or countersunk, so that any material that may find its way into the perforations shall freely escape therefrom and that the foraminous surfaces may be thus kept free.

I will now describe the operation of my device, taking as the substance to be treated ordinary garbage, from which it is desired to recover the liquid or moisture and grease or oleaginous substances, leaving the remaining mass as free from moisture and liquid as practicable.

All the valves leading to the tank A are closed, as is also the opening C. The tank is then charged and opening B is closed. Valve $f$ is now opened, and under certain conditions valve $c$ may also be opened. The cooking agent passing out of the perforated pipe U and coil V enters and cooks the material. This operation of cooking is continued for a period sufficient to thoroughly disintegrate the material, break down the cells, and release the contained moisture and grease. When the cooking is accomplished, valves $b$, Y, and Z are closed and valve $g$ opened, and when desired pressure is obtained on tank J valves $d$ and $a$ are opened and steam or other fluid is introduced at the desired pressure. The material being held in relatively or comparatively thin bodies and subjected to the fluid-pressure from opposite faces or surfaces, the liquid portions are driven from it and flow out at the bottom, the solid matters of the charge acting as a filtering medium and substantially retaining all particles of matter held in suspension in the grease and liquid, however small. This is a most important point, since it recovers or retains valuable matter hitherto lost or recovered only at considerable expense and labor after the pressing operation. The liquid extracted from the mass will begin to flow into the tank J through the pipe K. It will be seen that instead of forcing the mass against the perforate portions of the tank the steam passes through said openings inward toward and against the material and compresses the same. It is found that by this method of treatment the resultant liquid is freer from particles of solid matter than is the case where the material is pressed or forced against a screen. For this reason the material may be cooked longer than is ordinarily done, which additional length of cooking is of great importance in breaking down the liquid-cells in the various substances treated. During the compression of the substance in tank A the pressure in said tank is substantially the same as that in tank J, but should it be desired to lower the pressure in tank J, close valves $f$ and $g$ and manipulate valves $b$, $c$, and $y$ to obtain the desired pressure. This may be done at the end of the compression, and the consequent circulation set up through pipe K would draw off any remaining liquid from the substance under treatment. After all the liquid is driven off, which fact can be ascertained by inspection of the gage-glass or by subjecting the substance to pressure for a determinate time, valves $a$, $f$, $c$, and $d$ are closed and valve S is opened, which permits the escape of steam from the tank. When the pressure-gage shows no pressure in the tank, the manhole B is opened, the chambers G and H are elevated, and the remaining mass is drawn out through the opening C. The tank is then ready to be recharged.

The process as given above is for matter containing grease, but I do not desire to be understood as limiting myself thereto in the use of the apparatus, or in the method of expressing set forth herein.

The liquids which have been driven over into tank J are now to be treated. The valve Y is closed, if previously open, and steam under pressure is admitted through pipe W. Valve $b$ is opened and the liquid is forced into tank L through the previously-prepared filter-bed into the pipe O. From thence it may pass through the settling-tank N or be conveyed through pipe P to any desired point.

The procedure after cooking and extraction may vary as to the steps themselves or the order in which they are performed. They may be carried out in the order recited above or varied therefrom, and the process may be a continuous one, if desired. Under most circumstances, where a large quantity of material is handled, more than one cooking and expressing tank will be employed, in which case the tank J may be made of such dimensions as to accommodate the liquid flowing from the several tanks.

I do not desire to limit myself to the use of the tank L or the settling-chamber N, as either or both may be omitted, if desired; nor do I wish to be understood as giving a precise statement of what takes place in tank A when the pressure is applied. I can only judge of what actually occurs from the results attained. When the pressure is removed, I find that the material which under former methods was firmly packed against the screen F and the walls of chambers G and H is now condensed and found standing away from the perforate walls.

Under some conditions it may be expedient to cover the perforate surfaces with cloth or pervious material.

In some instances a partial separation of the grease and water may be effected in the tank J. After the liquids have been allowed to enter said tank the grease will naturally rise to the top if the contents are permitted to stand. After the stratification takes place the water may be drawn off through pipe Z. When this is accomplished, the grease may be passed through the filter-bed for purification or drawn directly from the tank.

As before stated, the apparatus is capable of use in various ways, in whole or in part, and I do not wish to be understood as restricting myself to any special order or grouping of the different steps nor to the use of the apparatus as a whole. The tank A may alone be used without the other parts of the apparatus.

In the foregoing description I have referred to the specific construction illustrated in the drawings, which form of apparatus is admirably adapted to the carrying out of the process; but I wish it understood that I believe myself to be the first to compress a mass of material from opposite faces or surfaces inward, or toward the center, through the application of pressure fluid to such faces. I therefore mean to claim this method broadly and without regard to the subdivision of the charge or to the form or mode of mounting and arranging the containing vessel or holder. So, too, I desire it understood that while steam is proposed as the fluid to be used any elastic medium not precluded by working condition in a given case may be employed, as, for instance, air or gases. With substances injured by heat such substitution will be advantageous.

To permit the introduction of elastic mediums other than steam, I provide a valved pipe $i$, which connects with the pipes leading to the inlets to the tank A.

Having thus described my invention, what I claim is—

1. The method of expressing liquids from a mass or charge of material which consists in applying fluid-pressure to all parts of its surface simultaneously.

2. The method of expressing liquids from a mass or charge of material, which consists in dividing said mass into a number of comparatively small bodies and applying fluid under pressure to all the surfaces of the divided bodies.

3. The method of expressing liquids from a mass or charge of material which consists in dividing the mass or charge by a series of perforate bodies, and applying fluid under pressure to all the surfaces of the divided mass through said perforated bodies.

4. The method of expressing liquids from a mass or charge of material, which consists in cooking the mass, and then applying fluid-pressure to all parts of its surface simultaneously.

5. The method of expressing liquids from a mass or charge of material, which consists in first dividing the mass into a number of comparatively small bodies, cooking the same, and finally applying fluid under pressure to different faces or surfaces of the mass simultaneously.

6. The method of expressing liquids from a mass or charge of material, which consists in first dividing the material into a number of comparatively small bodies; applying fluid under pressure to different faces or surfaces of the mass simultaneously, and finally collecting the resultant liquids in a tank in which pressure is maintained.

7. The method of treating garbage and like material, which consists in sustaining the mass in a perforate surface; cooking the same; applying fluid under pressure simultaneously to different faces or surfaces of the mass; collecting the resultant liquids, and separating the grease from the liquid.

8. A rendering-tank, comprising the shell or body provided at its upper end with a charging-opening; a perforate false bottom or grid; an opening C in line with said grid; one or more perforate draining-chambers resting upon the false bottom, and means for elevating said chambers.

In witness whereof I hereunto set my hand in the presence of two witnesses.

STEPHEN E. WILSON.

Witnesses:
CHAS. D. HASTINGS,
M. H. CHAMBERLAIN.